United States Patent [19]
Valentine et al.

[11] 3,885,640
[45] May 27, 1975

[54] SLIDE ASSEMBLY FOR SNOWMOBILES

[75] Inventors: Louis A. Valentine, Aurora; Henry L. Valentine, Boulder, both of Colo.

[73] Assignees: Louis A. Valentine; Henry L. Valentine, both of Aurora, Colo.

[22] Filed: Dec. 11, 1970

[21] Appl. No.: 97,172

Related U.S. Application Data

[63] Continuation-in-part of Ser. No. 7,540, Feb. 2, 1970, Pat. No. 3,637,265.

[52] U.S. Cl. ............................................. 180/5 R
[51] Int. Cl. ..................... B62m 27/02; B62d 55/10
[58] Field of Search ......... 305/24, 25; 180/5 R, 5 A

[56] References Cited
UNITED STATES PATENTS

| | | | |
|---|---|---|---|
| 1,682,622 | 8/1928 | Löfström | 180/5 A |
| 1,763,826 | 6/1930 | Smyth | 305/25 |
| 2,339,886 | 1/1944 | Shannon | 180/5 R |
| 2,409,501 | 10/1946 | Krotz | 267/57.1 A |
| 3,120,963 | 2/1964 | Seckel | 280/28 |
| 3,309,150 | 3/1967 | Marier | 305/27 |
| 3,362,492 | 1/1968 | Hansen | 305/27 X |
| 3,485,312 | 12/1969 | Swenson | 180/5 R |
| 3,507,346 | 4/1970 | Hauser | 180/5 R |
| 3,545,821 | 12/1970 | Erickson | 180/5 R |
| 3,637,265 | 1/1972 | Valentine | 305/24 |
| 3,658,392 | 4/1972 | Perreault | 180/5 R |

*Primary Examiner*—Philip Goodman
*Attorney, Agent, or Firm*—Van Valkenburgh, Lowe & Law

[57] ABSTRACT

A slide track suspension for a snowmobile wherein the slides which support the snowmobile upon its drive track are carried upon a frame having transversely disposed pivot bars whereon spring loaded, inclined rocker arms extend downwardly and rearwardly to the slide. In the present invention, the arms at one side of the snowmobile swing independently of the swinging movements of the arms at the other side, but are interconnected by a slack clutch means to limit the independent movement. This permits the snowmobile to lean sidewise to a limited extent as when it is turning or traversing a hillside. Other improvements include adjustments to the length of the arms, longitudinal grooves underneath the slide track to pick up snow and reduce the friction on the slide tracks and a slide shift modification of the connection of the slides to the arms.

10 Claims, 17 Drawing Figures

PATENTED MAY 27 1975 3,885,640
SHEET 1
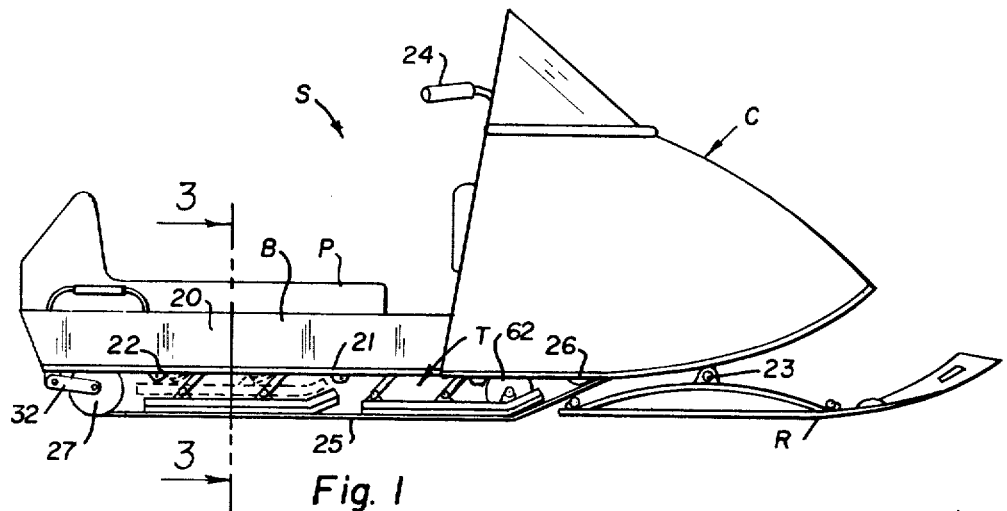
Fig. 1
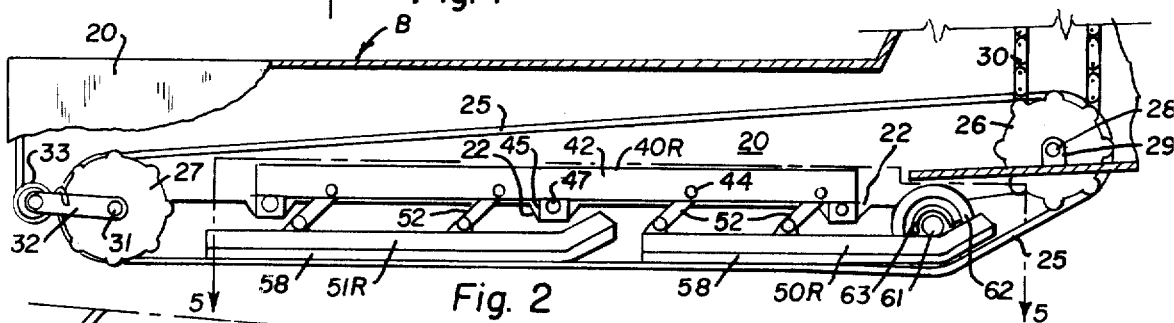
Fig. 2
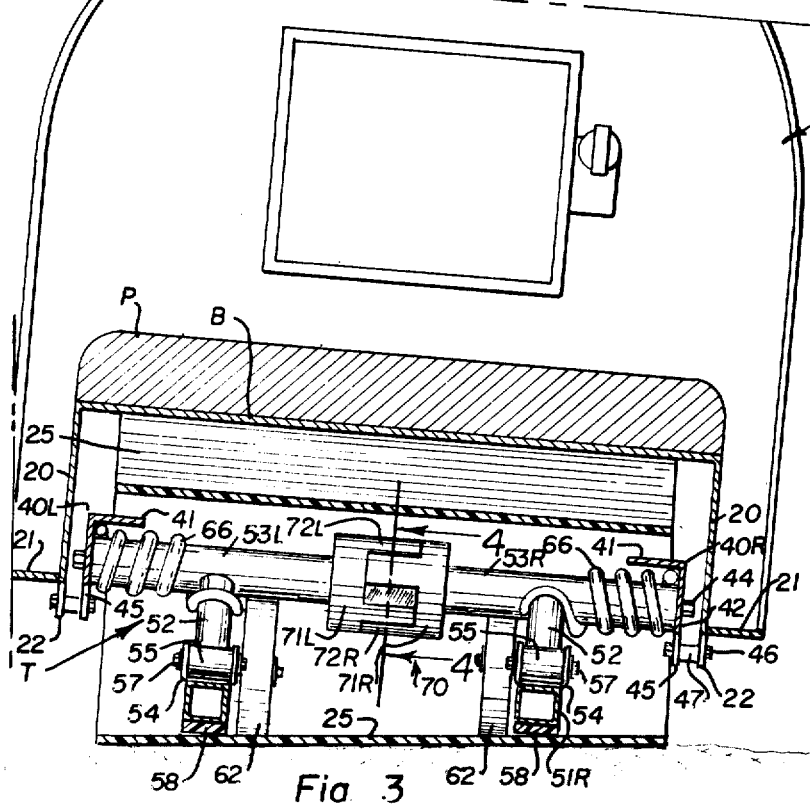
Fig. 3
Fig. 4
INVENTOR.
Louis A. Valentine
Henry L. Valentine
BY Van Valkenburgh & Lowe
ATTORNEYS

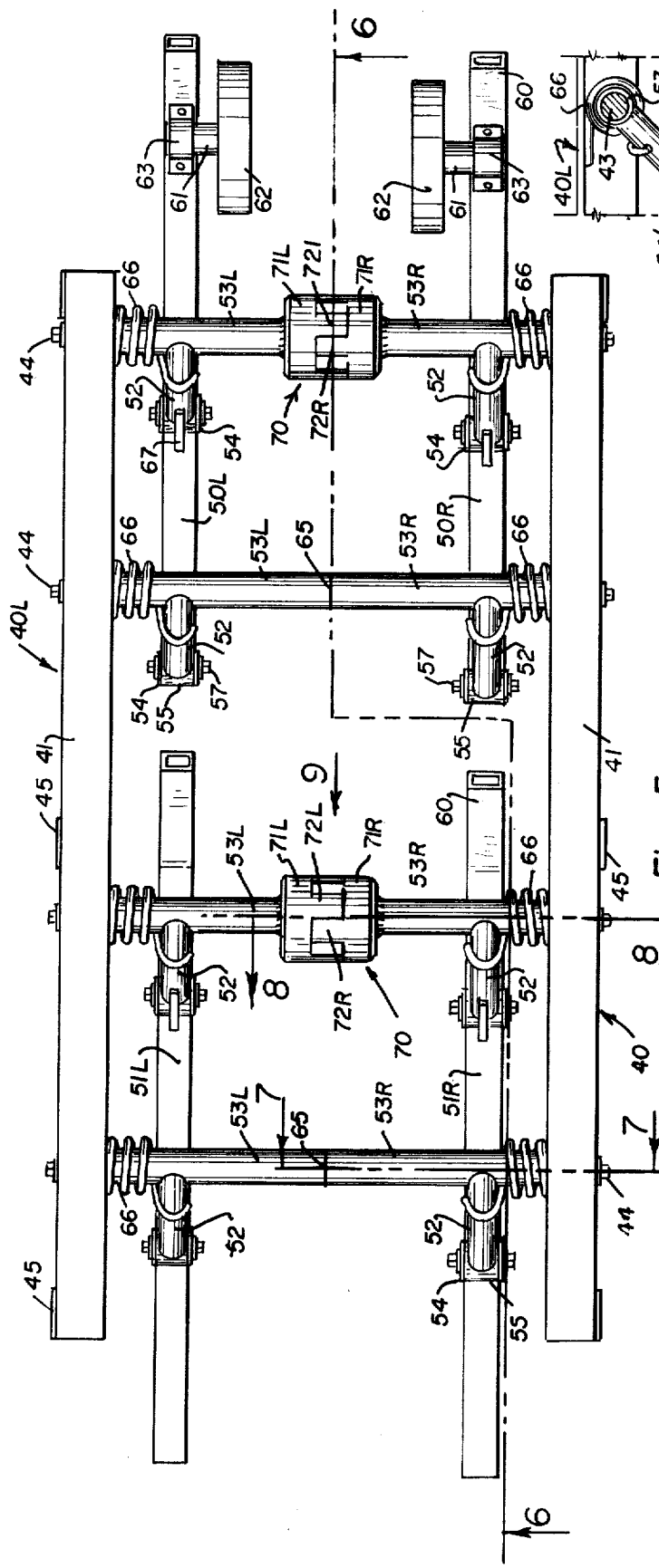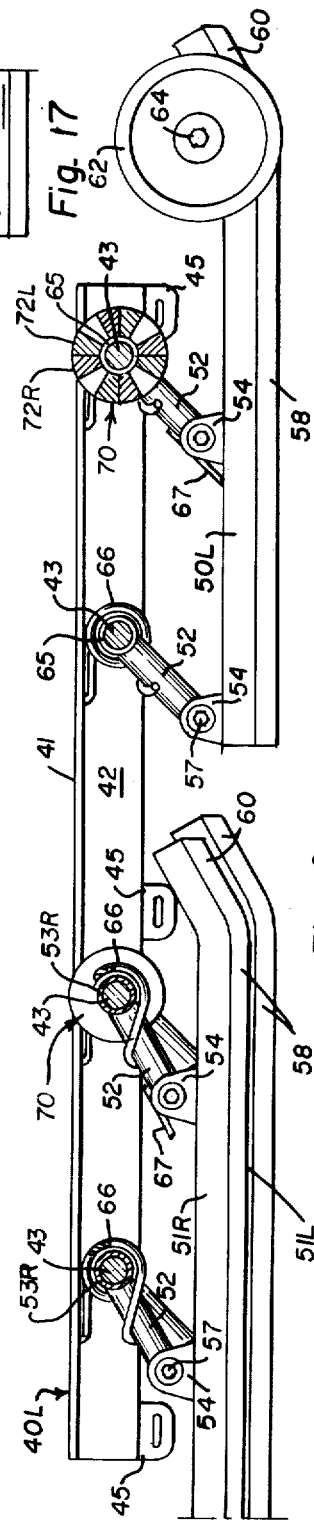

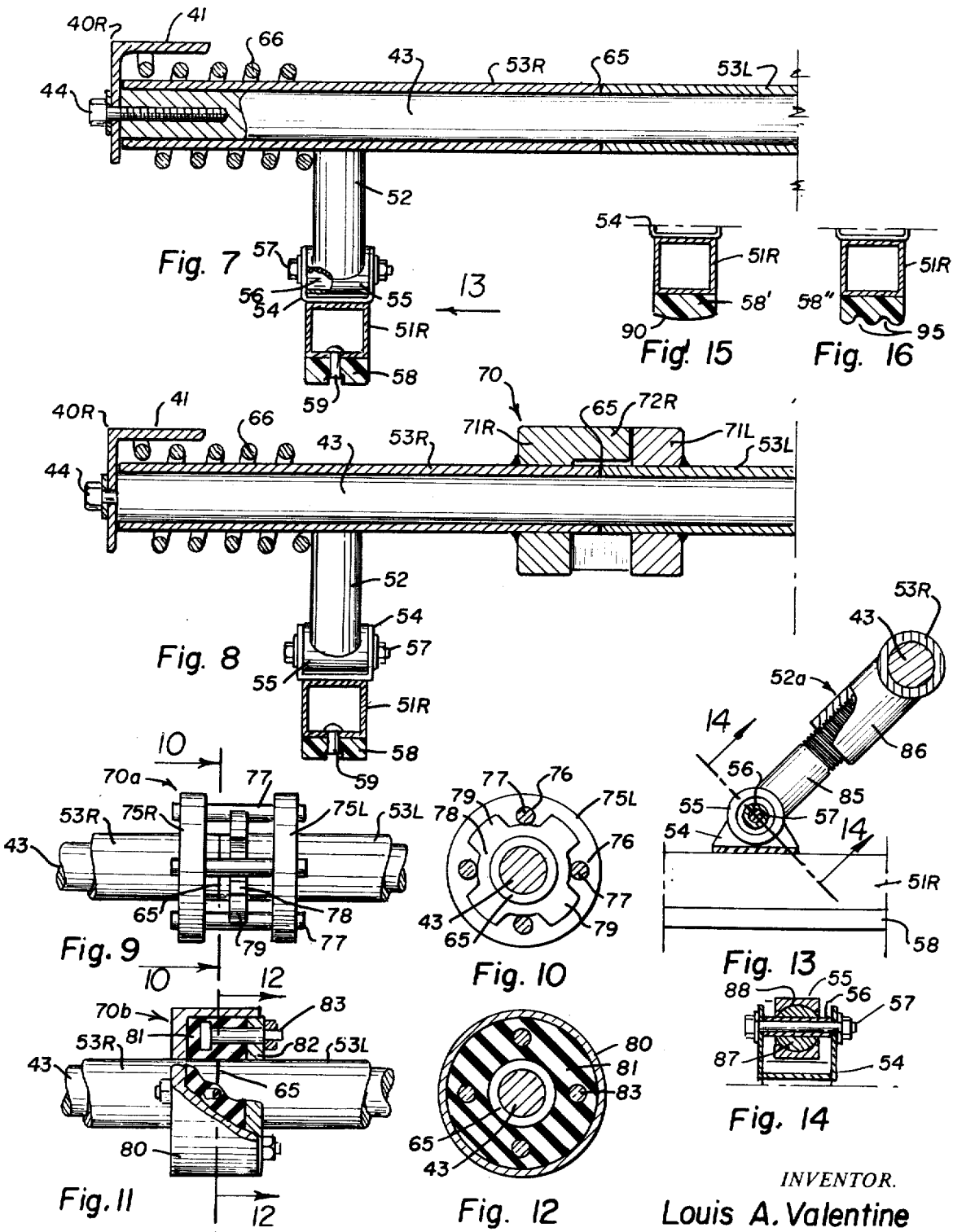

SLIDE ASSEMBLY FOR SNOWMOBILES

The present application is a continuation-in-part of our copending application, Ser. No. 7,540, filed Feb. 2, 1970, now U.S. Pat. No. 3,637,265.

This invention relates to powered sleds, commonly called snowmobiles, and more particularly to improvements in slide track suspensions for snowmobiles.

A primary object of the present invention is to provide, in a flexible slide track suspension for a snowmobile, a linkage between the left-hand and the right-hand slides of the suspension system to permit one slide to partially deflect independently of the other.

The various types of snowmobiles which are presently being marketed by a number of manufacturers are all similar in their basic arrangements, although they vary somewhat in size, appearance and power output. This basic arrangement consists of an elongated body having a cowl-covered engine at the forward end of the body. The passenger section, an elongated seat, is at the rearward section, behind the engine and the controls at the cowl. A pair of ski-like sled runners support the forward end of the snowmobile and these runners rotate and swing to constitute a steering means, controlled by handle bars at the front of the passenger section. The snowmobile is driven by a track, a comparatively wide endless belt which extends underneath the body of the snowmobile behind the runners and is extended about forward drive wheels and rearward idler wheels. The reach of the track between the drive and idler wheels is mounted upon a supporting suspension assembly. This suspension assembly may be either an array of idler wheels or slide tracks. The present invention concerns a suspension assembly using slide tracks and will thus be hereinafter referred to as a "slide track suspension," and the slide tracks simply as "slides."

By using lightweight but powerful two cycle engines, a snowmobile is capable of traversing a countryside at speeds in excess of 40 miles per hour. However, the operation of a snowmobile at high speeds can be hazardous because of irregularities of the snow surface such as the hummocks which are commonly referred to as moguls. Whenever a snowmobile hits a mogul at high speed, the resulting sudden uplift and the subsequent drop will cause the snowmobile to buck, sometimes in a violent manner and this bucking can cause the operator to lose control of the vehicle. The operator and passengers can even be thrown forwardly and over the snowmobile in a manner which can cause an injury.

Another feature of snowmobiles which has created operative problems consists in the use of slide track suspension systems which have the left-hand and right-hand slides interconnected so that these slides will flex in unison. This arrangement has heretofore been considered necessary to assure a stable ride when travelling at high speed. However, when turning the snowmobile, it becomes desirable to tip the same into a curve, such tipping action being an inherent reflex of any rider especially when turning about a curve which is not banked. Therefore, the conventional arrangement of simultaneously flexing both sides of the snowmobile slide tracks is an undesirable feature. Also, trouble has been encountered in traversing a slope with a snowmobile for the snowmobile will lean downhill. The natural inclination of a rider is to hold the snowmobile in a vertical position or even lean it into the hill.

The present invention was conceived and developed with the above considerations in view and comprises, in essence, a slide track suspension having slides which flex in a vertical direction to permit the snowmobile to traverse moguls and similar hummocks of snow in a smooth, easy manner. Also, and more especially, the present invention will permit a slide track at one side of the snowmobile to flex independently of the flexing of the track at the opposite side of the snowmobile, but only to a limited extent and in a manner which will not detract from the stability of the unit. Such side flexing will permit the snowmobile to respond to weight shifting movements of the operator in taking a curve and in traversing slopes. In a preferred construction; two independent slide track units are provided in tandem and either set of slides can flex independently of the other. Other features of the invention include refinements in the slide track suspension unit which permit the supporting arms to be adjustable and longitudinal grooving arrangements at the slide surfaces to provide for smoother and freer operation of the apparatus in snow.

It follows that another object of the invention is to provide a novel and improved slide track suspension for a snowmobile which will minimize the bouncing and bucking action of the snowmobile as it is driven over moguls similar irregularities of a snow surface.

Another object of the invention is to provide a novel and improved slide track suspension system which can be tipped into a curve or tipped in a hillside when traversing the same.

Another object of the present invention is to provide a novel and improved slide track for a snowmobile which is easily mounted upon any of a number of different types and makes of snowmobiles, and easily adjusted for various heights of the snowmobile.

Another object of the invention is to provide a novel and improved slide track suspension for a snowmobile having its operative components proportioned to better yield to the irregular snow surfaces commonly traversed by snowmobiles and respond to maneuvers of the operator with resulting improvements in stability, traction and shock absorption in the snowmobile.

Another object of the invention is to provide a novel and improved slide track suspension for a snowmobile which articulates in such a manner as to permit the snowmobile to be tipped sidewise to better turn and traverse a hill, but only to a limited extent to maintain the basic stability of the snowmobile so it may be operated safely at high speeds.

Other objects of the invention are to provide a novel and improved slide track suspension for a snowmobile which is a lighweight, low cost, reliable, rugged and durable unit.

With the foregoing and other objects in view, all of which more fully hereinafter appear, our invention comprises certain constructions, combinations and arrangements of parts and elements as hereinafter described, defined in the appended claims and illustrated in preferred embodiment by the accompanying drawing in which:

FIG. 1 is a side elevational view of a snowmobile having the improved slide track suspension mounted therein with broken lines indicating the manner in which a slide will deflect when the unit is in operation.

FIG. 2 is a fragmentary portion of the snowmobile shown at FIG. 1, but on an enlarged scale and with portions of the snowmobile body broken away to better show a side elevation view of the track slide suspension assembly.

FIG. 3 is a transverse sectional view of the lower portion of a snowmobile as taken from the indicated line 3—3 at FIG. 1, but on an enlarged scale and with the snowmobile being tipped towards the right side as when it is being directed into a curve.

FIG. 4 is a fragmentary sectional detail as taken from the indicated line 4—4 at FIG. 3, but on an enlarged scale.

FIG. 5 is a top plan view of the track slide per se, as taken from the indicated line 5—5 at FIG. 2, but on an enlarged scale.

FIG. 6 is a longitudinal offset sectional view as taken from the indicated line 6—6 at FIG. 5, but with one of the slide portions being shown at a position corresponding, comparatively, to its position at FIG. 3.

FIG. 7 is a fragmentary transverse sectional detail as from the indicated line 7—7 at FIG. 5, but on a further enlarged scale.

FIG. 8 is a fragmentary transverse sectional detail as from the indicated line 8—8 at FIG. 5, but on a further enlarged scale.

FIG. 9 is a fragmentary view, as taken from the indicated arrow 9 at FIG. 5, but on an enlarged scale and illustrating a modified construction thereof.

FIG. 10 is a sectional detail as taken from the indicated line 10—10 at FIG. 9.

FIG. 11 is a fragmentary view, partially in section, similar to FIG. 9, but illustrating another modified construction thereof.

FIG. 12 is a sectional detail as taken from the indicated line 12—12 at FIG. 11.

FIG. 13 is a fragmentary detail view of a support arm as taken from the indicated arrow 13 at FIG. 7, but illustrating a modified construction thereof to render the length of the arm adjustable and to permit the slide track to incline with respect to the arm.

FIG. 14 is a fragmentary sectional detail as taken from the indicated line 14—14 at FIG. 13.

FIG. 15 is a fragmentary sectional detail similar to a portion of the showing at FIG. 7, but illustrating a modified construction of the slide.

FIG. 16 is a fragmentary sectional detail similar to FIG. 15, but illustrating another modified construction of the slide.

FIG. 17 is a fragmentary portion similar to FIG. 6, but showing a modification of the connection of an arm to a slide.

In referring to the drawing, the common features of the snowmobile will generally be described first, before describing the improved constructions which constitute the present invention.

The snowmobile S, as shown at FIG. 1, consists of an elongated flat body B and a cowl C at the front of the body wherein the engine, gas tank and other controls, not shown, are housed. The body and cowl are metal plate members which are folded or otherwise formed into a rigid structure. The body portion behind the cowl is the drivers and passengers section and a seating pad P is provided for that purpose. The body B appears in section as an inverted U, best shown at FIG. 3, with longitudinal side panels 20 each having a laterally extended foot support 21 and an array of depending ears 22 for holding the slide track suspension T as hereinafter described.

Ski runners R are mounted at the front of the snowmobile and carried upon resilient supports 23. The runners R are connected with a steering handle bar 24 at the rear of the cowl C. The construction of the resilient supports and the connection of the handle bars with the runners R is not shown in detail since both are conventional.

The drive track 25 extends underneath the body behind the ski runners to support the snowmobile and this track, a comparatively wide endless belt, is stretched between front drive wheels 26, rear idler wheels 27. The improved slide track suspension T lies in the reach between these wheels so that the slides of the suspension, hereinafter described, will support the snowmobile upon the underreach of the track 25. The front drive wheels 26 are positioned above the slide track T to downslope the portion of the track 25 extending from the wheels to the slides, as illustrated. These front drive wheels are carried upon a shaft 28 secured in bearings 29 mounted upon the body frame, as best shown at FIG. 2. A chain 30 extends from a drive sprocket within the cowl, not shown, and connects with a sprocket on the drive wheel shaft 28 also not shown. the rear idler wheels are carried upon a shaft 31. This shaft is connected to the body by a resilient mount such as rocker arms 32, which are resiliently biased by coil springs 33, as illustrated, to permit the rear wheels to yield to changes in the vertical alignment of the belt supporting the snowmobile. This mechanism also has an arrangement of tightening screws, not shown, to permit adjustments to the track tension.

The improved slide track suspension T, best shown at FIGS. 5–8, is a longitudinally extended structure, symmetrical from each side of the longitudinal center plane of the snowmobile. It includes an upper framework consisting of a pair of spaced parallel angle members 40R and 40L, each having an inturned upper flange 41 and a depending outward wall flange 42. These angle members are held apart by an array of transverse pivot bars 43, which also hold rocker arms as hereinafter described. Each end of each bar 43 abuts against the inner face of a wall flange 42 and is secured thereto by a bolt 44 extending through a hole in the flange 42 and into a tapped hole in the pivot bar 43 as best illustrated at FIG. 7.

This frame 40 is secured to the underside of the snowmobile body B. The spacing between the framework angle members 40R and 40L is less than the spacing between opposing side panels 20 of the snowmobile body B so that it may be mounted upon any of a number of different types of snowmobiles. Accordingly, the frame may be connected to the bracket ears 22. Side plate lugs 45 are welded to the wall flanges 42 of the frame angles with a lug being in alignment with each bracket ear 22. A mounting hole is provided in each lug 45 to register with a corresponding mounting hole in the aligned bracket ear 22, and the holes are positioned so that the slide track suspension will be at the proper location and at the proper elevation for supporting the snowmobile upon the underreach of the track 25. A connective bolt 46 extends through each lug 45 and into the corresponding ear 22. Tubular spacers 47, when required, are placed upon the bolts between the lugs and ears to securely and neatly hold the slide track frame at a centered position underneath the snowmobile.

The slide suspension T includes a pair of forward slides 50L and 50R and a pair of rearward slides 51L and 51R which extends below the frame members 40L and 40R, to support the snowmobile body upon the lower reach of the track 25. Each slide is held by a front and a rear rocker arm 52, and each rocker arm slopes downwardly and rearwardly from a pivot tube 53 which is sleeved upon a pivot bar 43 to a pivotal connection at a clevis 54 upon the slide. These arms are resiliently biased downwardly by springs as hereinafter described, and thus they will swing about their pivot bars 43, with the front and rear rocker arm of a slide remaining in spaced parallelism at all positions of the slide. Accordingly, the slide may raise and lower but remain in spaced parallelism with the frame thereabove, as best illustrated at FIG. 6.

The lower end of each rocker arm, connecting to its slide, is welded to a short, transversely disposed tubular bearing 55 which is carried upon a shaft 56 which, in turn, is embraced by the clevis 54 upstanding from the slide as shown at FIG. 7. A connective bolt 57 holds the shaft onto the clevis to complete the pivotal connection of the rocker arm to the slide.

Each slide 50L, 50R, 51L and 51R is formed as a tubular member preferably square in section. An antifriction pad 58 of nylon, teflon or of a similar selected material may be secured to the underside of each slide tube as by countersunk rivets 59 as shown at FIGS. 7 and 8. The leading end of each slide is turned upwardly as at a toe 60, so that the track 25 will not catch upon a leading edge of the slide as it moves under the slide. To avoid any possible grabbing of the track 25 by a forward slide 50L or 50R as it moves downwardly from the front drive wheel 26, each forward slide carries a short, transverse shaft 61 whereon an idler wheel 63 is mounted, preferably alongside the inner edge of the slide and at the base of the toe 60. Each idler wheel shaft 61 is held upon its forward slide 50L or 50R by a bracket 63 welded or otherwise secured to the upper side of the slide and the wheel is secured to the shaft as by a bolt 64, as best illustrated at FIG. 5.

Consonant with the present invention, the slides 50L, 50R, 51L and 51R are movable independently of each other, at least to a limited extent as hereinafter described. This is rendered possible by providing each rocker arm with an independent pivot tube 53, and each pivot tube 53 will extend half-way across its pivot bar 43 and to the center of the unit to slidably abut an opposing pivot tube as at 65. However, whenever the snowmobile is loaded in a balanced manner, as when it is setting upon a flat surface, the rocker arms 52 supporting the rear of the snowmobile will be inclined rearwardly and downwardly from the slide track frame 40 in an even manner and at an angle which is about 45° from the vertical, but which may vary from 30°–60°. To support each arm, a comparatively heavy spring 66 is wound about the end of each pivot tube 53L, or 53R, with one end of the spring being abutted against the undeside of the top flange 31 of the frame 40 and with the other end of the spring extending downwardly from the pivot tube 53 to be hooked about the rocker arm 52. The several springs on the pivot bars are proportioned to effectively support the weight of the snowmobile and of the passengers riding it. Naturally, without any load upon the snowmobile, the pressure of the springs will force the rocker arms to extend the snowmobile upwardly to an abnormal position. To prevent this, a stop 67 may be provided at a selected position at the base of at least one rocker arm of each slide to abut against the top of the slide to which the arm is connected, as illustrated at FIGS. 5 and 6.

These rocker arms are thus resiliently biased to support the weight of the snowmobile and yet yield to changing pressures which are encountered when the snowmobile is travelling over uneven surfaces. In the basic arrangement, each pair of rocker arms supporting a slide must yield together to permit the slides to raise or lower and such action may be in conjunction with, or independently of, the movement of the other slides. The forward slides 50L and 50R will normally operate together and ordinarily ahead of the operation of the rearward slides 51R and 51L as when the snowmobile moves over hummocks or moguls of snow. This independent movement of the forward and rearward slides will prevent forward and rearward tipping, or bucking of the snowmobile.

Another important feature of the present invention resides in the independent connection of the slides at one side of the snowmobile with respect to the corresponding slides at the other side of the snowmobile since the pivot tubes 53L and 53R on each pivot bar separate at the center juncture 65. This freedom of movement permits a snowmobile to tip sidewise as illustrated at FIG. 3. There the snowmobile is tipped to the right by an upward movement of the right-hand slides 50R and 51R. Whenever a snowmobile can lean thus, the operator is better able to control it in a turn or in traversing a hillside. However, when operating the snowmobile under some conditions, this leaning of the snowmobile to one side is preferably limited in some manner. In the first place, it would be possible for a rider to lean too heavily to one side of the snowmobile and to the point where he might even tip it over. Also, it was found that if the slides at one side would move independently of those at the other side, the snowmobile might be unstable at high speeds.

To thus limit the movement of a slide at one side of the snowmobile with respect to the slides at the other side of the snowmobile, a clutch means may be used to interconnect pivot tubes 53L and 53R on at least one of the pivot bars 43, which supports the forward slides 50L and 50R and also on at least one of the pivot bars which supports the rearward slides 51L and 51R. It is essential that such a clutch means have some slack to permit some degree of relative movement between the pivot tubes 53L and 53R. If desirable, the clutch means may be used on all of the pivot tubes 53L and 53R.

The clutch 70, illustrated at FIGS. 3 through 8, is formed as two rigid, washer-shaped heads 71L and 71R, each of which is secured upon its respective pivot tube 53L and 53R adjacent to each side of the center juncture 65 of the tubes. Each head 71L and 71R carries an array of fingers 72L and 72R, respectively, which outstand from the side of the heads to loosely intermesh. These fingers are preferably pie-shaped segments which extend about the pivot tubes and are proportioned to provide a substantial slack space 73 between them to allow for free rotative movement of one pivot tube with respect to the other within the limit of the slack space 73. In the illustration at FIG. 4, the fingers 72R are rotated counter clockwise to abut against fingers 72L, a position which will be assumed when the slide 51R is deflected more than the slide 51L to tip a snowmobile to the right as shown at FIG. 3. When the snowmobile is level, the fingers 72R will move away from the fingers 72L to provide a substantially uniform slack space 73 between all of the fingers so that a limited tipping movement will be possible in either direction. The spacing 73 is determined by the length of the arms 52 and the desired amount of tip. In the unit illustrated, a spacing is chosen which will permit one arm to swing about 30° from an extreme position with respect to the other. This may be varied to any desired amount of tip.

Although the rotation of the pivot tubes 53L and 53R is restrained by the springs 66, it may be desirable to provide a further resilient restraint between the pairs of pivot tubes 53L and 53R in such a manner as to urge the snowmobile to normally assume a horizontal or level position. Accordingly, the modified clutch 70a, shown at FIGS. 9 and 10, may be used to accomplish this function. In this arrangement, a pair of comparatively heavy washer-shaped heads 75L and 75R are affixed to the respective pivot tubes at a selected spacing from the center juncture 65. Each head 75 is provided with a circle of holes 76, mutually aligned with the holes in the other head, and snugly fitted torsion spring bars 77 are fitted into these holes in a cage-like array. Accordingly, whenever one of the pivot tubes rotates with respect to the other, such rotation is resiliently resisted by the flexing of these torsion bars and the further the snowmobile is tipped sidewise from the normal horizontal or the level position assumed by it, the greater the force which is required to induce this tipping. As a further feature of this arrangement, the extent of the rotation of one pivot tube with respect to the other may be limited. A disc 78, having fingers 79 between the spring bars 77, is mounted upon one of the pivot tubes between the heads 75. Whenever the deflection becomes excessive, the bars 77 will abut against the fingers 79 to stop further movement.

Another clutch structure, 70b, is shown at FIGS. 11 and 12. In that arrangement, a cup-like retainer 80, having a heavy rubber washer 81 within it, is fitted to the tube 53L. A cap 82, fitted to the other tube 53R, closes the retainer. The rubber washer 81 is connected to the bottom of the cup and to the cap by bolts 83 and accordingly, any differential movement of one pivot tube with respect to the other will be resisted by the flexing of the rubber washer within the cup.

Various other features may be included in the structure of this slide track suspension. FIGS. 13 and 14 illustrate a modified rocker arm 52a which is extendable to provide for adjustments in the height of the snowmobile. Each rocker arm is formed as two parts, a threaded bar 85 extending from the clevis 54 into an internally threaded, tubular socket 86.

As a further feature, this adjustable arm 52a may also be connected to its slide clevis 54 by a universal type connection to permit the slide to tip slightly with respect to the arm. Such a connection may be a ball and socket joint, such as illustrated at FIG. 14. The ball 87 is carried upon the shaft 56 and the socket 88 is within the bearing tube 55.

Instead of permitting the slides to tip sidewise on the rocker arms, they may be permitted to tip or lean upon the drive track 25. The undersurface 90 of the track, which is illustrated as a plastic anti-friction pad 58', may be formed as an arcuate portion as illustrated at FIG. 15. This arcuate undersurface 90 will always contact a substantial portion of the drive track regardless of any tip of the snowmobile.

Another modification consists of providing longitudinal grooves 95 in the undersurface of the slide, as in the anti-friction pad 58" as illustrated at FIG. 16. Whether a pad was used, or whether the slide bore directly against the track, these grooves were found to be effective in accummulating and retaining snow when the snowmobile is in operation. The result is a low-friction surface whereagainst the track moves.

A further modification to the structure is shown at FIG. 17 wherein one of the rocker arms 52 of each of the slides 50R and 50L and/or 51R and 51L is connected to clevis 54' which is slotted as at 95, to permit longitudinal movements of the base of the arm with respect to the slide. As illustrated in the other figures, the pivoted connection of the forward and rearward arms 52 of a slide to the frame 40 forms a parallelogram and the slide remains parallel to the frame as it moves towards and away from the frame. With the slot 95 in the clevis 54', however, another degree of freedom of the slide with respect to the frame is obtained. The slide may not only move towards and away from the frame 42, but may also tip with respect to the frame and this tipping action is desirable in smoothing out the bouncing of the slides when the snowmobile is moving over rough terrain.

We have now described our invention in considerable detail. However, it is obvious that others skilled in the art can build and device alternate and equivalent constructions which are nevertheless within the spirit and scope of our invention. Hence, we desire that our protection be limited, not by the constructions illustrated and described, but only by the proper scope of the appended claims.

We claim:

1. In combination with a snowmobile having a drive track mounted between forward drive wheels and rearward idler wheels, a slide track assembly adapted to engage the lower reach of the track between the drive and idler wheels to support the snowmobile thereon, and comprising:

a. a frame including a pair of longitudinally disposed members carried on the snowmobile, one at each side of the track, and transversely disposed pivot bars between the longitudinal members;

b. a plurality of longitudinally disposed slides below the frame and upon the lower reach of the track with one slide being at each side of the track;

c. inclined rocker arms at each side of the frame with one end of each arm pivotally connecting with a pivot bar and the other end of each arm pivotally connecting with a slide to permit the slide to move upwardly toward and downwardly away from the frame;

d. means associated with each rocker arm to bias the arms and slides thereon downwardly and away from the frame and thus support the snowmobile above the track and to permit vertical movements of the slides as when the snowmobile is moving over rough terrain;

e. the rocker arm connections with the pivot bars including a pivot sleeve fixedly attached to each rocker arm and carried upon its pivot bar, the pivot sleeves at one side of the frame being independent of the pivot sleeves at the other side of the frame, whereby the rocker arms and the slide at one side of the frame is permitted to move independently of the rocker arm and the slide at the other side of the frame so as to permit the snowmobile to tilt sideways;

f. clutch means interconnecting the pivot sleeves on a pivot bar whereby pivotal movement of the rocker arm at one side thereof will act against the rocker arm at the other side thereof, wherein the clutch means includes:

means to permit a predetermined degree of movement of the rocker arm and slide at one side of the frame with respect to the other side and to interlock the rocker arm and slides of both sides when the movement of one exceeds the said predetermined degree of movement.

2. In the slide track assembly defined in claim 1, wherein:

said clutch means and its means to permit a predetermined degree of movement of the rocker arm and slide at one side of the frame with respect to the other side and to interlock the rocker arms and slides of both sides when the movement of one exceeds the said predetermined degree of movement includes a slack clutch; and said slack clutch includes means to permit a limited rotation of one sleeve with respect to the other and to interlock the sleeves when said limited movement is exceeded.

3. In the slide track assembly defined in claim 2, wherein said slack clutch comprises:

a head upon each pivot sleeve adjacent to the juncture between the pivot sleeves at the center of the pivot bar; and an array of fingers outstanding from each head with the fingers of one head intermeshing with the fingers of the other head and with a selected spacing between the fingers to provide for a slack movement between the heads before the fingers of one engage the fingers of the other.

4. In the slide track assembly defined in claim 2, wherein said slack clutch comprises:

a head upon each pivot sleeve adjacent to the juncture between the pivot sleeves at the center of the pivot bar; and a resiliently yieldable connective means between the heads, biased to urge the pivot sleeves to a position where the slide tracks at one side of the frame will be at the same relative position as the slide tracks at the other side of the frame to thereby permit but resiliently resist tipping movements of the unit.

5. In the slide track assembly defined in claim 4, wherein said resilient means includes:

an array of spring bars connected into each head.

6. In the slide track assembly defined in claim 4, wherein said resilient means comprises:

a rubber washer between the heads and connected to the opposing faces of the heads.

7. In the slide track assembly defined in claim 1, wherein:

said frame includes four transversely disposed pivot bars between the longitudinal members;

the slides include a forward pair and a rearward pair in tandem;

two rocker arms are pivotally connected to each slide and each arm extends therefrom forwardly and upwardly to a pivot bar;

the pivot sleeve on each rocker arm extends inwardly upon its pivot bar to the approximate center of the frame, to meet its opposing pivot sleeve; and said clutch means interconnects the meeting pivot sleeves upon at least one of the pivot bars of each pair of slides and includes means to permit a predetermined degree of independent movement of the pivot sleeve at one side with respect to the pivot sleeve at the opposite side and to interlock the pivot sleeves whenever the movement exceeds the said predetermined degree of independent movement.

8. In the slide track assembly defined in claim 7, wherein each slide is formed as a rigid, tubular member having an undersurface of low-friction material;

wherein the bottom of said undersurface is transversely arched to facilitate contact of a slide track whenever the slide is tipped laterally responsive to sidewise tipping of the snowmobile.

9. In the slide track assembly defined in claim 7, wherein the connection of the rocker arms with the slides includes a ball and socket to permit the slides to tip laterally with respect to the arms when the snowmobile is being tipped sidewise.

10. In the slide track assembly defined in claim 9, wherein said rocker arm means includes:

a pivoting means at each end to interconnect the rocker arm to the pivot means and the slide;

an arm member therebetween formed as two components: a rod and a sleeve telescopically fitted over the rod; and means associated with these components to telescopically adjust the length of the arm.

* * * * *